United States Patent [19]

Choi

[11] Patent Number: 4,502,695
[45] Date of Patent: Mar. 5, 1985

[54] MECHANICAL SEAL WITH FLUID FLOW-REVERSING MEANS

[76] Inventor: Kyu-Hwan Choi, 438-1, Namoi-Dong, Ulsan, Kyungsangnam-Do, Rep. of Korea

[21] Appl. No.: 533,916

[22] Filed: Sep. 20, 1983

[51] Int. Cl.³ .............................................. F16J 15/40
[52] U.S. Cl. ........................................ 277/12; 277/67; 277/135
[58] Field of Search ................... 277/3, 27, 67, 83, 68, 277/69, 135, 173

[56] References Cited

U.S. PATENT DOCUMENTS 3,395,645 8/1968 Vilet ................................. 277/27 X
3,731,940 5/1973 Spruiell ................................. 277/12

Primary Examiner—Robert S. Ward, Jr.
Attorney, Agent, or Firm—Cushman, Darby & Cushman

[57] ABSTRACT

A mechanical seal for reversing a flow of leakage between a rotational shaft and an inner wall of a stuffing box in a centrifugal pump is provided. The seal is ensured by a cylindrical flow-reversing impeller secured to the shaft to rotate as the shaft rotates, having flow-reversing means at the front end of the impeller. The flow-reversing means is positioned in a space defined between the shaft and the inner wall of the stuffing box. O-ring means are provided to prevent leakage during periods of non-rotation of the shaft, and securing means provide selective securing of the O-ring means.

6 Claims, 2 Drawing Figures

MECHANICAL SEAL WITH FLUID FLOW-REVERSING MEANS

FIELD OF THE INVENTION

This present invention relates to a mechanical seal useful as a shaft-sealing apparatus for various industrial centrifugal pumps, and more particularly to a mechanical seal for maintaining a safety seal between a rotational shaft and a stuffing box in the pumps.

BACKGROUND OF THE INVENTION

In the prior art, shaft-sealing apparatus for preventing fluid from leaking through the shaft mainly used gland packings and mechanical seals, but there has been a need to improve their mechanical structure. That is, if gland packings are used as the shaft-sealing apparatus, friction between the packing and the rotational shaft causes the shaft to be worn out. Furthermore, in such a case mechanical losses due to friction causes more power consumption. Also, these packings did not perfectly prevent the fluid from leaking; therefore, various problems could arise resulting from the leakage, for example, pollution, abrasion and loss of raw materials. On one hand, in case conventional common mechanical seals are used, an annular sealing member with a sealing face precisely ground should be employed; therefore, the leakage could be perfectly prevented but there are many other problems. That is, it is not easy to precisely manufacture the sealing member due to the necessity of flat grinding. In addition, these mechanical seals require higher production costs and careful attention to handling with the risk of break-down with high hardness materials materials also having low stiffness; therefore, it was impossible to use them in large capacity pumps which create large vibrations or multi-step pumps which have excessive clearance of the shaft. They also were not suitable with pumps operating around high temperature and pressure, and pumps using a high density fluid or a viscous fluid. Moreover, if leakage occurred, such pumps required disassembly for service or repair.

SUMMARY OF THE INVENTION

The primary object of the present invention is to provide a new mechanical seal for industrial centrifugal pumps which eliminates the problems encountered in conventional shaft-sealing apparatus.

Another object of the invention is to provide a new mechanical seal which does not create an abrasion in a rotational shaft of the centrifugal pumps and which reduces the power-consumption due to friction.

Another object of the invention is to provide a mechanical seal which is applicable to all kinds of pumps and which maintains perfect sealing conditions with simple construction without requiring a sealing member of a special material needing precise grinding, as is required in a conventional mechanical seal.

Still another object of the invention is to provide a mechanical seal for reversing leakage flow, which is constructed to prevent leakage by virtue of reducing the leaking pressure of the fluid by means of reversing leakage flow against the leaking direction in the stuffing box of centrifugal pumps.

These and other objects can be achieved by the mechanical seal of the invention which reverses a flow of leakage between a rotational shaft and an inner side of a stuffing box in a centrifugal pump, and which comprises a cylindrical flow-reversing impeller secured to a shaft to rotate together with the latter and having at the front end of the impeller a flow-reversing means which is disposed in a space defined between the shaft and the inner side of the stuffing box.

So that the impeller for reversing fluid flow rotates integratedly with the rotational shaft, the impeller has a cylindrical form adapted to be fitted in the rotational shaft and, is, at the tip thereof, provided with a flow-reversing means to make leakage flow in a reverse direction upon rotating. Each of the reversing means so constructed may be provided either with a spiral gear adapted to force the fluid to feed out in a given direction around the tip of the cylindrical impeller upon rotating, or with a plurality of leakage spray holes perforated angularly from the inside of the cylindrical impeller toward the outside thereof. In both cases, it is possible for leakage to flow in a reverse direction against the usual leaking direction by virtue of the centrifugal force resulting from the rotation of the rotational shaft; thereby, the leaking pressure can be reduced and leakage prevented.

BRIEF DESCRIPTION OF THE DRAWINGS

The invention will further be illustrated in conjunction with the accompanying drawings, wherein.

DETAILED DESCRIPTION OF THE INVENTION

Figure 1:
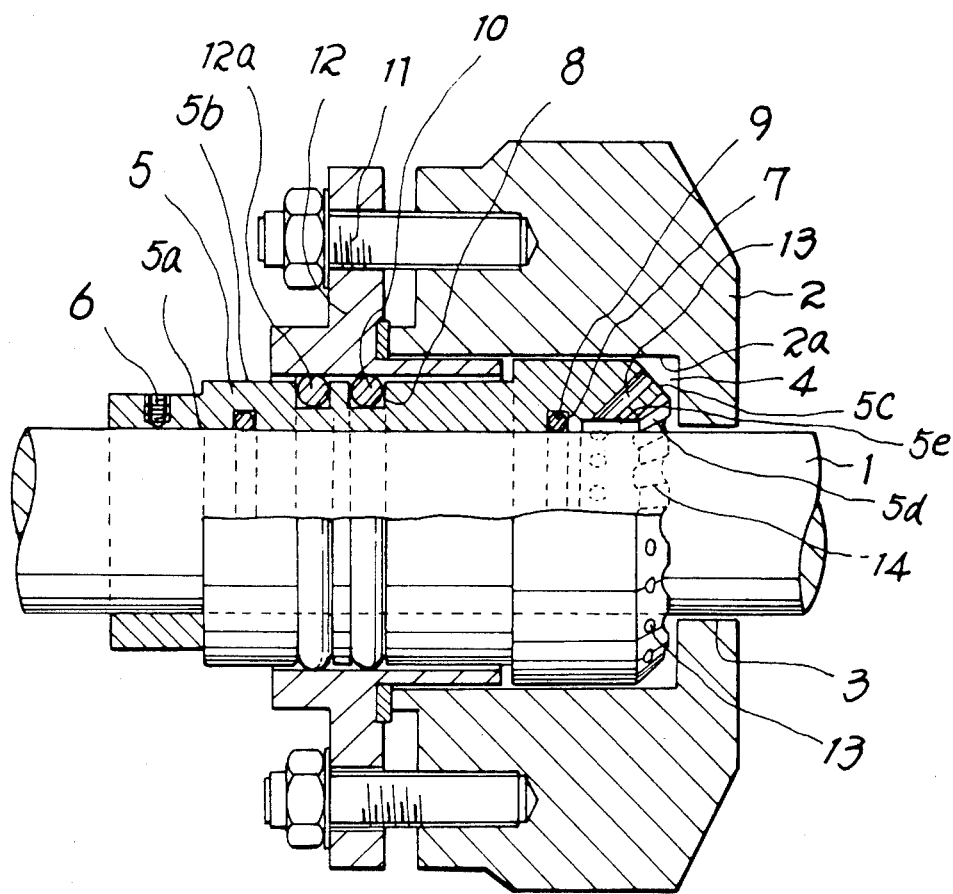
FIG. 1 is a sectional view of a preferred embodiment according to the invention.

Referring now to FIG. 1 which depicts an embodiment of the invention, rotational shaft 1 is disposed in a stuffing box 2 with a shaft bore 3 in a pump housing. Between the shaft 1 and an inner wall 2a of the stuffing box 2, an annular space 4 is provided to fit the sealing member thereinto.

A cylindrical flow-reversing impeller 5 is fitted into the rotational shaft 1 at the inside of the annular space 4, and the impeller 5 is fixed with a fixing bolt 6 on the rotational shaft 1 at the rear end thereof. At selected positions on an inner side 5a and an outer side 5b of the impeller 5, annular recesses 7 and 8 are formed so that on each of the recesses an inner O-ring 9 and an outer O-ring 10 are mounted.

A locking bolt 11 attaches selectively a seal cartridge 12 to the rear side of the stuffing box 2. Therefore, the outer O-ring 10 is closely held to the inner side 12a of the cartridge 12, while the inner O-ring 9 is stuck on the outside of the rotational shaft 1.

The front periphery of the reversing impeller 5 is cut away and formed as an L-shaped section to define an external slope 5c and an internal slope 5d. A plurality of leakage spray holes 13 are perforated radially and angularly from the external slope 5c toward a front internal face 5e of the impeller 5. Parallel to the holes 13, a plurality of semicircular recesses 14 are also formed radially in the internal slope 5d.

In the mechanical seal thus constructed according to the invention, when the pump is shut down, i.e., the rotation of the rotational shaft 1 is stopped, the leakage into the annular space 4 along the peripheral wall of the rotational shaft 1 through the shaft bore 3 of the stuffing box 2 tends to flow outside through the internal face 5a and the external face 5b of the impeller 5. However, this leakage can be shielded by means of the inner O-ring 9 and the outer O-ring 10 which are mounted in the annular O-ring recesses 7 and 8 of the faces 5a and 5b, respectively. On the other hand, when the rotational shaft 1 rotates with the operation of the pump, the impeller 5 rotates whereupon the leakage between the rotational shaft 1 and the impeller 5 is sprayed through the leakage spray holes 13 and the semicircular recesses 14 in the reverse direction by the centrifugal force of the impeller 5, so that the leaking pressure can be greatly decreased. Accordingly, the leakage through the shaft 1 can be entirely prevented.

Figure 2:
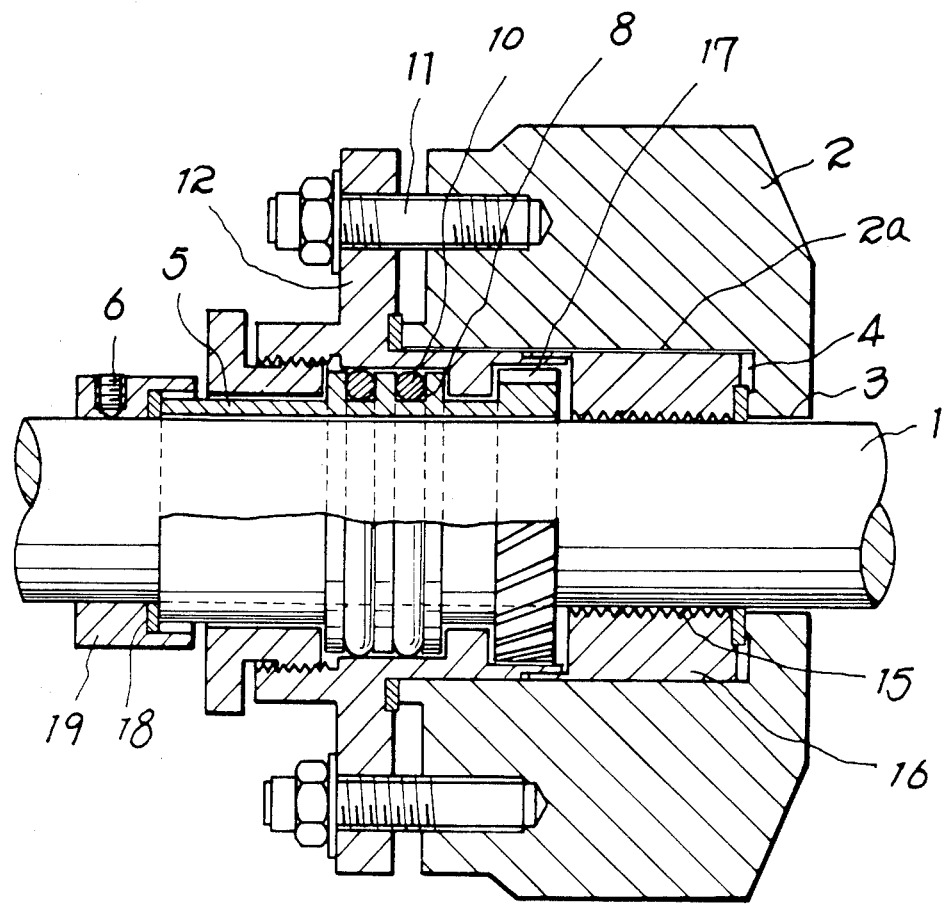
FIG. 2 is also a sectional view of another embodiment according to the invention.

In accordance with another embodiment of the invention illustrated in FIG. 2, there is provided an annular spiral bushing 16 with a spiral recess (depicted by symbol 15) in the internal side thereof in the annular space 4 defined between the inner side 2a of the stuffing box 2 and the rotational shaft 1. On the outer periphery of the front end of the impeller 5, a spiral gear 17 is provided integrally therewith so that when the rotational shaft 1 rotates, the leakage can flow reversedly into the spiral recess 15 in the inside of the bushing 16 by virtue of the gear 17. To this end around the other side of the shaft 1 the impeller 5 is housed. Via a wedge 18 of Teflon, a fixing ring 19 is secured to the rear end of the bushing 16 by means of a bolt 6.

As described above, the mechanical seal in accordance with the present invention is provided with a flow-reversing impeller which has a flow-reversing means for making leakage flow in a reverse direction opposite to the introducing direction of the leakage by virute of centrifugal force of the rotational shaft. Accordingly, the mechanical seal of the invention can reduce leaking pressure thereby preventing any leakage in the seal eliminating problems encountered in conventional mechanical seals and gland packings. More particularly, since the mechanical seal of the invention causes the reversing impeller to rotate together with the rotational shaft, the shaft can be free from abrasion. Therefore it is possible to reduce power consumption. Furthermore, in accordance with the invention, it is also possible to manufacture the sealing member on a large scale at a comparatively lower cost because the mechanical seal of the invention does not need high strength materials which require high precision work as required with conventional mechanical seals. Preferably, the mechanical seal of the invention can be used in large capacity pumps which create large vibrations or in multi-step pumps which have excessive clearance of the shaft. It is also suitable for pumps for fluids having high viscosity or high slurry content. Conventional mechanical seals have complicated construction that requires the pump to be disassembled for repairs should leakage occur. But, the mechanical seal according to the present invention can easily be repaired by replacing merely the worn-out O-rings by new ones after the seal cartridge 12 and the fixing bolt 6 are disjointed.

Such replacement can allow the mechanical seal to be reused so that the working life thereof may be much longer.

I claim:

1. A mechanical seal for reversing a flow of fluid leakage between a rotational shaft and an inner wall of a stuffing box in a centrifugal pump, comprising:
    a cylindrical flow-reversing impeller secured to said shaft for rotation simultaneous with said shaft rotation, and
    at the front end of said impeller, a flow-reversing means, disposed in a space defined between said shaft and said inner wall of said stuffing box, for causing flow reversal of fluid leakage which would otherwise occur around said shaft, wherein
    said flow-reversing means is formed with a plurality of leakage spray holes perforated angularly from a front internal face of said flow-reversing impeller toward an external face thereof.

2. A mechanical seal as in claim 1, further comprising:
    O-ring means, arranged angularly around said impeller and said shaft, for preventing fluid leakage from said pump whenever said shaft is not rotating.

3. A mechanical seal as in claim 2, further comprising:
    securing means for securing said O-ring means and selectively providing access to said O-ring means for replacement thereof.

4. A mechanical seal for reversing a flow of fluid leakage between a rotational shaft and an inner wall of a stuffing box in a centrifigual pump, comprising:
    a cylindrical flow-reversing impeller secured to said shaft for rotation simultaneous with said shaft rotation, and
    at the front end of said impeller, a flow-reversing means, disposed in a space defined between said shaft and said inner wall of said stuffing box, for causing flow reversal of fluid leakage which would otherwise occur around said shaft, wherein
    said flow-reversing means is formed with a spiral gear formed integrally and peripherally with the front end of said flow-reversing impeller.

5. A mechanical seal as in claim 4, further comprising:
    O-ring means, arranged angularly around said impeller and said shaft, for preventing fluid leakage from said pump whenever said shaft is not rotating.

6. A mechanical seal as in claim 5, further comprising:
    securing means for securing said O-ring means and selectively providing access to said O-ring means for replacement thereof.

* * * * *